United States Patent [19]

Kato

[11] E Patent Number: Re. 32,332

[45] Reissued Date of Patent: Jan. 20, 1987

[54] CLUSTER TYPE TAG PIN ASSEMBLY

[75] Inventor: Masami Kato, Nagoya, Japan

[73] Assignee: Toska Co., Ltd., Tokyo, Japan

[21] Appl. No.: 783,266

[22] Filed: Oct. 3, 1985

Related U.S. Patent Documents

Reissue of:

[64] Patent No.: 4,417,656
Issued: Nov. 29, 1983
Appl. No.: 254,755
Filed: Apr. 16, 1981

U.S. Applications:

[63] Continuation of Ser. No. 619,962, Jun. 6, 1984, abandoned.

[30] Foreign Application Priority Data

Sep. 11, 1980 [JP] Japan ..... 55-125275

[51] Int. Cl.[4] ..... A44B 9/00; B65D 85/24; G09F 3/12

[52] U.S. Cl. ..... 206/346; 24/150 FP; 40/24; 206/343; 206/820

[58] Field of Search ..... 24/72.7, 150 B, 150 FP, 24/298; 40/20 A, 20 R, 21 R, 24; 206/343, 346, 348, 380, 820; 292/322

[56] References Cited

U.S. PATENT DOCUMENTS

| | | | |
|---|---|---|---|
| 3,103,666 | 7/1963 | Bone | 24/150 FP |
| 3,273,705 | 9/1966 | Rieger et al. | 206/343 |
| 3,463,304 | 8/1969 | Gallee et al. | 206/346 |
| 3,733,657 | 5/1973 | Lankton | 40/24 |
| 3,850,297 | 11/1974 | Merser | 206/343 |
| 3,977,050 | 8/1976 | Perez | 24/150 FP |
| 4,263,730 | 4/1981 | Clements | 40/20 R |
| 4,361,935 | 12/1982 | Paxton | 206/343 |
| 4,456,123 | 6/1984 | Russell | 206/343 |

FOREIGN PATENT DOCUMENTS

| | | | |
|---|---|---|---|
| 7610989 | 5/1976 | Netherlands | 24/150 FP |

*Primary Examiner*—William Price
*Assistant Examiner*—Jimmy G. Foster
*Attorney, Agent, or Firm*—Blum, Kaplan, Friedman, Silberman & Beran

[57] ABSTRACT

Disclosed is a cluster type tag pin assembly having a multiplicity of tag pins adapted for use in securing price tags or the like to sold goods. The tag pin assembly includes a large number of tag pins each having a head portion, a cross bar and a filament portion through which the cross bar is connected to the head portion. Each side surface of the cross bar of each tag pin is formed at the central portion thereof with an expanded portion, and expanded portions of each adjacent cross bars are mutually joined.

11 Claims, 31 Drawing Figures

CLUSTER TYPE TAG PIN ASSEMBLY

Matter enclosed in heavy brackets [ ] appears in the original patent but forms no part of this reissue specification; matter printed in italics indicates the additions made by reissue.

*This is a continuation of application Ser. No. 06/619,962, filed June 6, 1984.*

BACKGROUND OF THE INVENTION

The present invention relates to a cluster type tag pin assembly and, more particularly, to a cluster type tag pin assembly in which tag pins are arranged on a connecting bar in contact with adjacent ones at least at the side surfaces of the cross bars.

Tag pins are used widely for securing price cards or labels to goods to be sold. The known tag pin is constituted by a head portion 1, cross bar 2 and a filament portion 3 interconnecting the head 1 and the cross bar 2, as will be understood from FIG. 1. Generally, the tag pin has a very small size. For instance, the diameter and length of the cross bar are 0.8 to 1.0 mm and 8 to 10 mm, respectively. The width, height and the thickness of the head portion are 8 to 10 mm, 3 to 5 mm and 0.7 to 1.0 mm, respectively. The length of the filament portion differs depending on the uses but usually ranges between 7 mm and 125 mm after the elongation. The minimum diameter of the filament portion after the elongation is 0.3 to 0.4 mm. These tag pins generally have a weight per pin between about 0.04 and 0.1 g., and are thus very fine in thickness.

Due to reasons concerning the production, packing, transportation and attaching to goods, 25 to 50 pieces of tag pins are assembled in a single group are are connected through connecting necks 4 to a common connecting bar 5 at a right angle to the latter to form a tag pin assembly P. This tag pin assembly P is formed unitarily from a thermoplastic resin such as nylon, polypropylene and the like of which molecules can comparatively easily undergo reorientation.

In ordinary tag pin assembly, the diameter of the cross bar 2 and the thickness of the head portion are about 1 mm, respectively, due to reasons concerning the fabrication of the mold. The cross bars 2 are arranged on the connecting bar 5 at a pitch of about 2 mm. This means that the distance between the cross bars of adjacent tag pins and the distance between the head portions of the adjacent tag pins are about 1 mm. In the tag pin assembly P having a multiplicity of tag pins p arranged at intervals, it is often experienced that the assemblies are entangled with each other with the head portions of one assembly jammed in the row of head portions of the other assembly or caught between the cross bars of the other assembly, during the packing or transportation of the assemblies.

The filament portion 3 of the tag pin assembly is usually drawn so that the minimum diameter is as small as about 0.35 to 0.4 mm. Thus, the filament portion is very thin and delicate. Therefore, if the tag pin assemblies are entangled with each other, a troublesome work is required to loosen and release the entangling.

Further, with such tag pin assemblies in which individual tag pins are arranged at relatively large intervals, even if an entanglement does not occur among tag pin assemblies, if often occurs even in a single tag pin assembly that head portions become out of an orderly arrangement and/or intertwined.

Particularly, with a tag pin assembly in which a great number of tag pins are arranged at relatively large intervals on a relatively long connecting bar, for example the connecting bar may be bent, and then crossbars of adjacent individual tag pins do not undergo contacting with each other, whereby the tag pin assembly is as a whole in a condition of being bent with ease. To avoid easy bending of the tag pin assembly, it is indispensable to make the connecting bar having a great thickness.

Therefore, in loading in an attachment device such a tag pin assembly of which individual pins are coarsely arranged and in applying tag pins one by one through merchandise, it occurs each time when the attachment device is operated that the tag pin assembly is as a whole caused to swing back and forth as shown in FIG. 2, or it tends to occur that tag pins of the assembly are permitted to move individually independently, whereby various difficulties are encountered. The attachment device cannot be operated at a desirable high efficiency. The tag pin is wrongly driven to have merchandise hooked by the same, whereby the merchandise, for example a fabric product made of a fine fiber yarns, is permitted to undergo damages such as yarn cut, fray, tear and/or the like.

Further, to provide large intervals between each adjacent tag pins as before mentioned means that the number is accordingly limited of tag pins which can be formed on connecting bars of a constant length.

For instance, assuming here that the pitch of the cross bar 2 is 2 mm, only 50 pieces of tag pins can be mounted on a single connecting rod having a length of 100 mm.

Therefore, in the tag pin assembly having a large pitch of tag pins, it is necessary to employ a mold of a large size in order to produce a tag pin assembly having a given number of tag pins. The aforementioned problems of entanglement occurs in addition to this inconvenience.

In order to overcome the problem of entanglement, it has been proposed to connect the heads of the tag pins by means of connecting string. This connecting string is stretched when the tag pin driven into the goods is severed and remains on the surface of the head portion of the tag pin in the form of a "whisker"-like projection.

For instance, in the case of a tag pin made of nylon, the connecting string is stretched to have a length which is 4 to 5 times as large as the original length before it is broken. In consequence, "whisker" of considerable length remains on the surface of the head portion of the tag pin.

Tag pins are used for attaching price tags to various kinds of goods. In the case of goods woven from fine yarns, the "whisker" hitches on the yarns to cause a cutting or fray of yarn.

The conventional tag pin assembly having, for example, 50 tag pins arranged at 2 mm pitch on a connecting bar of 100 mm long is rocked or swung as illustrated in FIG. 2 when it is loaded in an attachment device not only to deteriorate the efficiency of operation of the attachment device but also to cause the cutting or fray of yarns of the goods as stated above.

Thus, in the prior art, the problem of entanglement of tag pins is avoided by the use of a connecting string interconnecting the head portions. The use of connecting string, however, imposes a new problem of generation of "whisker" due to elongation of the connecting string, resulting in a breakage of the goods. In addition, there still is a demand for a large-size mold for shaping the tag pin assembly.

SUMMARY OF THE INVENTION

Under these circumstances, the present invention aims as its major object to overcome the problems of conventional tag pin assembly, such as entanglement, necessity for large-size mold and so forth.

It is a first object of the invention to provide a cluster type tag pin assembly which does not make a large swinging or rocking motion when it is loaded in an attachment device for the driving of each piece of tag pin to the goods to ensure a higher efficiency of operation and to avoid the damaging of goods attributable to hitching of tag pin on the goods.

It is a second object of the invention to provide a cluster type tag pin assembly having a large number of tag pins per unit length of the connecting bar to make it possible to produce a tag pin assembly having a large number of tag pins with a mold having a comparatively small size.

It is a third object of the invention to provide a cluster type tag pin assembly of which in applying the member tag pins to merchandise, the tag pins are separated at their joint portions by shearing force, which does not form any "whisker" on the surface of the head of tag pins and which is free from the problems such as mutual entanglement of tag pins or disorder of array of tag pins.

It is fourth object of the invention to provide a cluster type tag pin assembly which can be produced at a low cost per tag pin and which permits a successive use of a large number of tag pins.

To these ends, according to the invention, there is provided a cluster type tag pin assembly including a multiplicity of tag pins each having a head portion, a cross bar and a filament interconnecting the head portion and cross bar, the tag pin assembly being formed integrally from a plastic in such a state that the adjacent tag pins are joined to each other at least at expanded portions of the central portions of side surfaces of the cross bars thereof.

BRIEF DESCRIPTION OF THE DRAWINGS

in FIG. 10;

DESCRIPTION OF THE PREFERRED EMBODIMENTS

Preferred embodiments of the invention will be described hereinunder with reference to the accompanying drawings.

Figure 3:
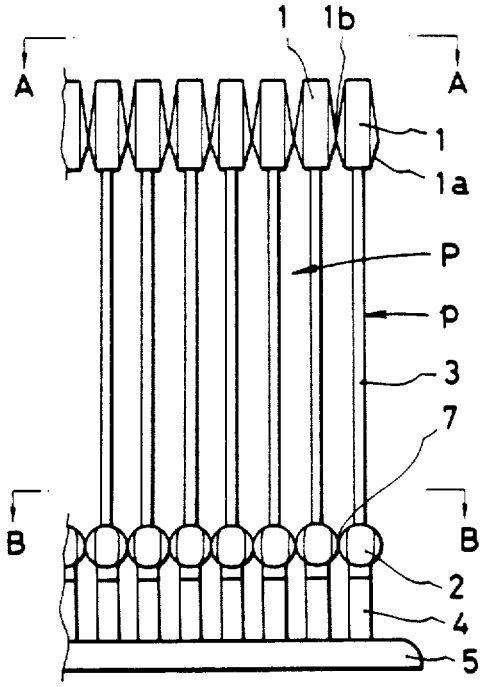
FIG. 3 is a front elevational view of a portion of a tag pin assembly constructed in accordance with a first embodiment of the invention.
Figure 4:
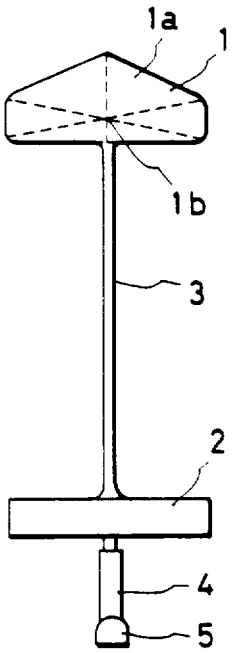
FIG. 4 is a side elevational view of the tag pin assembly shown in FIG. 3.

Referring first to FIGS. 3 and 4 which are a front elevational view and a side elevational view respectively of a tag pin assembly of the first embodiment, a tag pin assembly P has a multiplicity of tag pins P each of which has a head portion 1, cross bar 2 and a filament portion 3 interconnecting the head portion 1 and the cross bar 2. The tag pins are connected through connecting necks 4 to a connecting bar 5 at a right angle to the latter. Each tag pin assembly can include 25 to 50 tag pins and, in some cases, 100 tag pins connected to the connecting bar. The tag pin assembly is formed integrally from a plastic such as nylon, polypropylene or the like.

Linear synthetic polymers such as nylon, polypropylene and so forth are in a crystalline state under ordinary molding conditions. A shaped product, e.g. the filament portion of the tag pin, can be drawn in a hot or cold state so that the cross-sectional area of the filament is gradually decreased to increase the length and, accompanying thereto, increase the strength.

The present inventor has carefully examined such relationship between the condition for molding such linear synthetic polymers and the conditions for stretching and, as a result thereof, has discovered that certain specific tag pins are obtainable through cold molding.

The tag pin shaped by a mold of a temperature around 20° C. or cooled down to a lower temperature has an amorphous nature. The filament portion of this tag pin can be easily drawn at the room temperature. This characteristic of amorphous nature can effectively be used in the tag pin of the invention. Namely, when each tag pin is driven by an attachment device, the filament portion can be drawn to a suitable length. More specifically, when it is desired to penetrate the goods of a considerable thickness, e.g. a plurality of sheets of handkerchieves, plurality of pairs of socks and so forth, the filament portion is drawn by the action of a lever of the attachment device to have a length large enough to penetrate these goods thereby to firmly hold the latter.

Figure 5:
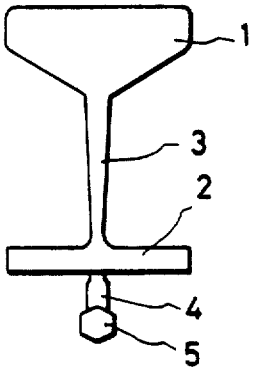
FIGS. 5 and 6 are side elevational views of filament before drawings.
Figure 6:
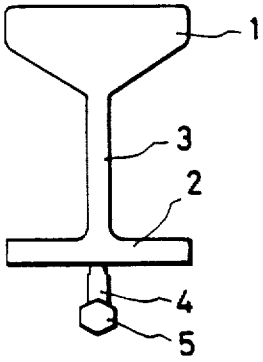

The filament portion 3 of a tag pin blank in the state before the drawing can have a tapered shape as shown in FIG. 5 or a shape with no taper as shown in FIG. 6.

In the tag pin assembly of the first embodiment, as shown in FIGS. 3 and 4, the side surfaces of the head portion is expanded at its central portion to form an expanded portion 1a. The expanded portion 1a opposes to the expanded portion 1a of head portion of adjacent tag pin, and the opposing expanded portions 1a are joined to each other at their ends 1b. In order to fo:.n the expanded portion 1a, the side surface of the head portion 1 is gradually thinned toward its marginal edge. In this first embodiment, the expanded portion 1a has a pyramidal shape with hexagonal cross-section as will be seen from FIG. 4. This, however, is not exclusive, and the expanded portion 1a can have pyramidal shape having other cross-sectional shape such as a triangular, square or circular cross-section. Further alternatively, sides of the head portion may comprise a virtually flat shape and have expanded portions formed only about their center portions.

Figure 7:
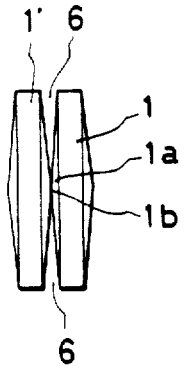
FIG. 7 is a view taken in the direction of the arrow A—A in FIG. 3.
Figure 8:
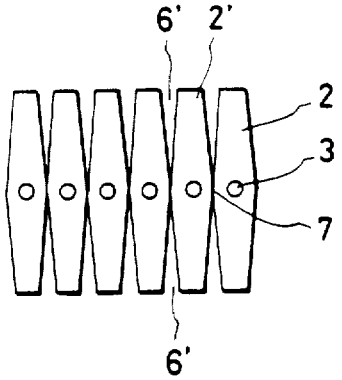
FIG. 8 is a view taken in the direction of the arrow B—B in FIG. 3.
Figure 9:
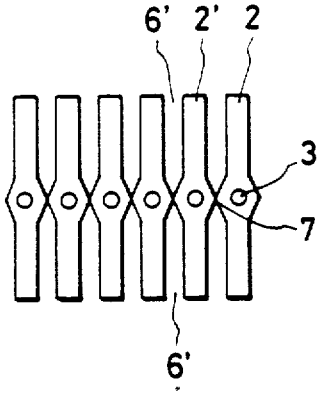
FIG. 9 shows a modified example of joint portions of crossbars shown in FIG. 8.

Between the adjacent head portions 1 having the expanded portions 1a, formed is a V-shaped small gap 6 as will be seen from FIG. 7 which is a view taken in the direction of the arrow A—A in FIG. 3. FIG. 8 is a view taken in the direction of arrow B—B in FIG. 3 and shows the cross bar 2. The cross bar 2 has such a side elevation as to have a thickness or width greatest at the lengthwise mid point and reduced toward both ends. The central portion of the cross bar having the greatest width constitutes a joint portion 7. Namely, adjacent cross bars 2, 2' are joined at their joint portions 7 with V-shaped small gaps 6',6' formed therebetween. Alternatively, it may be devised that as shown in FIG. 9, cross bars 2 and 2' have a substantially constant thickness in a side view thereof, except that expanded portions are formed in the vicinity of the central portion thereof.

Thus, the first embodiment of the invention is characterized in that adajcent tag pins are joined to each other at their head portions and cross bars. Consequently, a plurality of tag pins are arrayed in good order as if they formed a sheet.

The joint portions 1b and 7 of head portion 1 and crossbar 2 have such a power of connection which is great enough to always maintain adjacent tag pins in a joined-together state in normal conditions but small enough to allow the tag pins to be severed and separated when they are driven by an attachment device through an item of merchandise and when a shearing force is then acted upon the expanded portion in the joined together state, through the operation of the attachment device.

In the formation of the mold for producing the tag pin assembly of the first embodiment, the formation of walls to preserve the V-shaped small gaps 6, 6' has a considerable technical significance.

In ordinary tag pins, the head portion and cross bar have a length of about 9 mm. The thickness of the head portion and diameter of the cross bar are about 0.8 to 1.0 mm.

The wall of the mold for forming the V-shaped small gap has a minimum thickness of about 0.04 mm and maximum thickness of about 0.2 to 0.3 mm. It will be seen that the mold is formed to have walls which are as keen as a knife edge.

In the case of nylon 66, the joint portion 7 of the cross bar 2 can be broken without substantial drawing if the jointing area is selected to be about $0.6 \times 0.4$ mm. The joint portion should be designed and formed taking this point into account.

Figure 10:
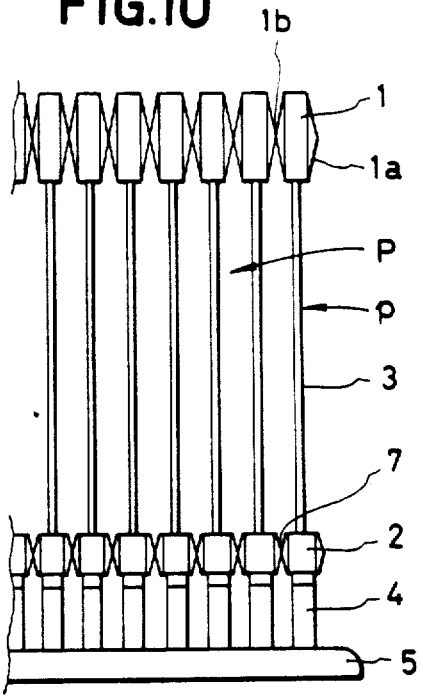
FIG. 10 is a front elevational view of the first embodiment with cross bars having a polygonal or rectangular cross-section.

Although the cross bar 2 is shown in FIG. 3 to have a circular cross-section, it can have a polygonal cross-section as shown in FIG. 10. As in the case of the cross bar shown in FIG. 3, the cross bar shown in FIG. 10 has the greatest width at its longitudinal mid portion and the width is gradually decreased toward both ends. The central portion having the greatest width constitutes a joint portion 7 at which adjacent cross bars are connected to each other.

As has been described, in the first embodiment of the invention, a joint portion is formed at a portion of each of the head portion and cross bar, and adjacent tag pins are joined at these joint portions. These joint portions are formed as contact point between opposing expanded portions of adjacent head portions or cross bars so that the joint area is separated easily and minimized to avoid formation of "whisker" when a tag pin is separated from the remainder tag pins formed by a shearing force.

Further, in the first embodiment of the invention the cluster type tag pin assembly is formed in the form of head portions and cross bars being respectively joined to adjacent head portions and crossbars, through central expanded portions, and thus the tag pin assembly as a whole behaves as if it is a sheet so that the undesirable entanglement of a plurality of tag pin assemblies, as well as disorder of array of tag pins is completely avoided.

Also in the assembly of the first embodiment, tag pins are so densely arranged that when the assembly mounted in an attachment device tends to bend, adjacent crossbars can undergo contact to effectively suppress otherwise likely swinging of the assembly, whereby not only an overall handling can be greatly facilitated but also the risk of damaging merchandise can be checked.

Tag pins are mutually connected at a sufficiently great power of connection and in as small an area of connecting as possible, so that they can be free of break at their joining portions during packing and/or transportation thereof. Also, when they are applied by an attacher to merchandise, a shearing force is acted upon the joining portions to cause tag pins severed from one another, therefore there lies no fear of formation of a "whisker"-like projection and of causing yarn breakage in applying tag pins to fiber-made goods.

FIGS. 11, 12, 13 and 14 show a second embodiment of the invention, in which the head portion 1 has a flat shape and provided with no joint portion. Namely, as will be seen from FIG. 11 and FIG. 13 (view taken in the direction of arrow A—A of FIG. 11), the head portions 1 of adjacent tag pins in the assembly are separated from each other.

Figure 11:
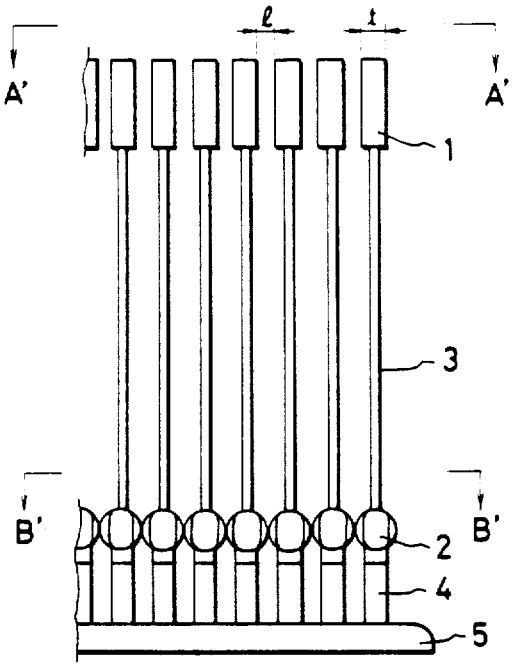
FIG. 11 is a front elevational view of a portion of a tag pin assembly constructed in accordance with a second embodiment of the invention.
Figure 14:
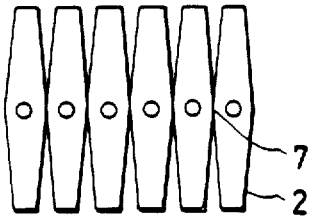
FIG. 14 is a view taken in the direction of the arrow B'—B' of FIG. 11.

On the other hand, as in the case of the first embodiment, the cross bar has such a shape that the width is greatest at the longitudinal mid portion and gradually reduced toward both ends, the central portion having the greatest width constituting a joint portion 7 at which adjacent cross bars 2 are joined as shown in FIG. 11 and FIG. 14 (view taken in the direction of arrow B—B of FIG. 11). The gap 1 between adjacent head portions is selected to be sufficiently small with respect to the thickness t of the head portion 1. More specifically, the thickness t of the head portion is usually 0.7 to 1.0 mm, while the gap 1 is usually 0.2 to 0.7 mm, preferably 0.2 to 0.5 mm and more preferably 0.2 to 0.3 mm. By selecting the gap 1 sufficiently small as compared with the thickness t of the head portion, the head portions are held substantially in contact with each other.

In the tag pin assembly of the second embodiment, tag pins are arrayed and held as if they form a sheet, partly because adjacent tag pins are joined at the joint portions 7 of the cross bars 2 and partly because the gap 1 between head portions of adjacent tag pins is selected to be sufficiently small as compared with the thickness t of the head portion. Therefore, the gag pin assembly of the second embodiment can be handled easily without any entanglement with other tag pin assemblies and disorder of array of tag pins in each assembly. When tag pins are driven through merchandise, the joint portion or joining portion is broken by shearing force, and a "whisker"-like projection can be prevented from being formed.

Figure 15:
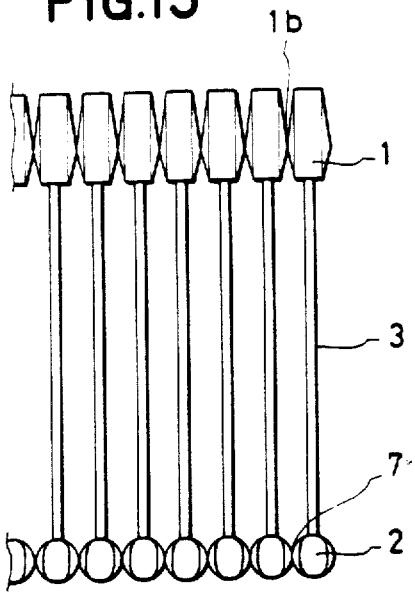
FIG. 15 is a front elevational view of a portion of a tag pin assembly constructed in accordance with a third embodiment of the invention.

FIG. 15 shows a tag pin assembly of the third embodiment of the invention in which, as in the case of the first embodiment, the head portion 1 and cross bar 2 are expanded at their mid portions in each tag pin to provide joint portions 1b and 7 at which adjacent tag pins are joined. In this embodiment, however, the connecting neck 4 and the connecting bar 5 are omitted. This third embodiment is based upon the following idea.

Figure 16:
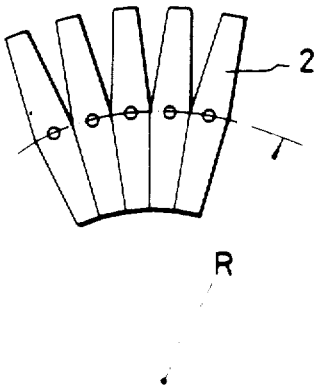
FIG. 16 is an illustration showing the state of curvature of array of cross bar of this embodiment.

In the first embodiment of the invention shown in FIG. 3, the joint portion 7 is formed at a mid portion of the cross bar 2 of each tag pin, and V-shaped small gaps 6, 6' are formed between heads of adjacent tag pins and between cross bars of the same. Therefore, when the connecting bar 5 is bent, the assembly of the cross bars 2 is curved into an arcuate form having a radius R as shown in FIG. 16. However, as a matter of fact, the assembly can hardly be bent at such a small curvature partly because the side surfaces of the cross bars do not tightly contact each other and partly because the cross bar has a diameter and a length of 0.8 to 1 mm and 8 to 10 mm, respectively. In addition, the resiliency of the connecting bar 5 itself prevents the assembly from being bent at such a small curvature. Needless to say, the radius R shown in FIG. 16 becomes comparatively large if the angles of the V-shaped gaps 6, 6' between adjacent cross bars 2 is selected to be small.

Thus, if the connecting bar 5 and the connecting necks 4 are omitted, it becomes possible to bend the tag pin assembly in a manner shown in FIG. 16 and to prevent further deformation of the same.

In a tag pin assembly of the third embodiment, the connecting necks 4 and the connecting bar 5, which have nothing to do with the attaching of price tag or the like, are omitted, while allowing the tag pins to be connected only at the joint portions 1b and 7 on the head portion and cross bar. In consequence, the tag pin assembly as a whole is made quite compact and the plastic material is saved considerably.

In addition, since the head portions and cross bars of adjacent tag pins are joined, the tag pins are arranged highly densely to provide a high degree of integration of tag pin assembly. For instance, it is possible to arrange 100 pieces of tag pins in an assembly having a length of substantially 100 mm. The undesirable entanglement of assemblies and disorder of array of tag pins in each assembly are completely avoided as in the cases of the preceding embodiments.

Figure 17:
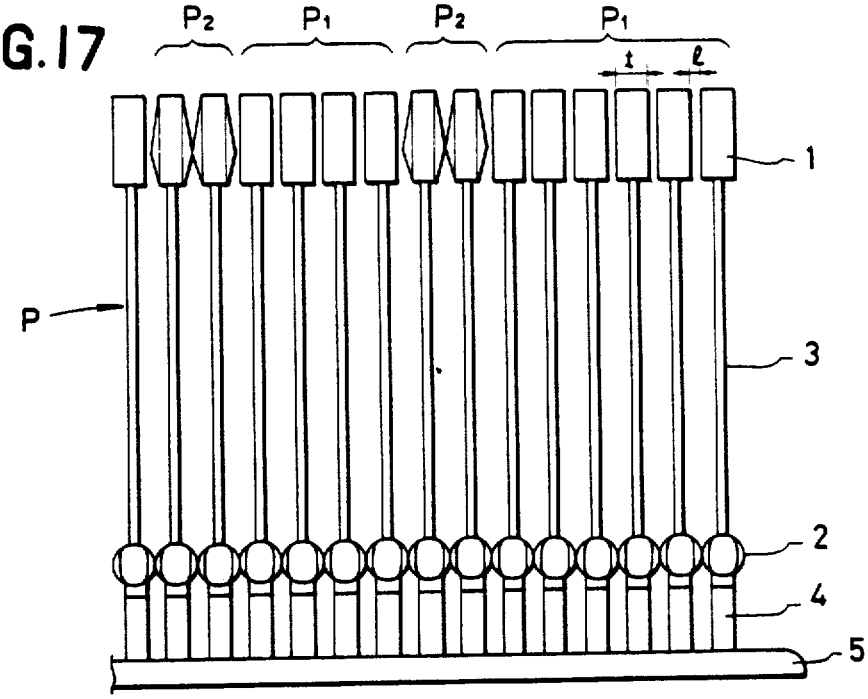
FIG. 17 is a front elevational view of a portion of a tag pin assembly constructed in accordance with a fourth embodiment of the invention in which a group of tag pins having separated head portions and a group of tag pins having joined head portions are arranged alternatingly.

FIG. 17 shows a fourth embodiment of the invention in which a group $p_1$ of tag pins in which the head portions are separated and a group $P_2$ of tag pins in which the head portions are joined are arranged alternatingly. This alternating arrangement of two groups $p_1$, $p_2$ is quite effective in preventing the disorder of array of head portions of tag pins.

Namely, in the case where the head portions 1 of adjacent tag pins are joined as in the first embodiment (FIG. 3) and third embodiment (FIG. 15), the oscillation of the joined head portions is not so large provided that the filament portion 3 has a small length, so that the head portions move as a unit. However, if the filament portion 3 has a substantial length and reduced diameter, it can no more support the united head portions. In such a case, the filament portions 3 is bent extremely.

The movement of the head portions as a unit can be avoided by arranging two groups $p_1$ and $p_2$ of tag pins alternatingly in the manner shown in FIG. 17. As a result, an altogether motion of the plurality of head portions is effectively checked and the number of head portions which are to be born by the filament portion 3 is decreased, so that the undesirable bending of the filament portion 3 and, hence the disorder of array of head portions 1, are avoided even when the filament portion 3 is made long and thin.

In FIG. 17, further, between the thickness of the head portion and the distance between head portions of each adjacent tag pins in the case of group $p_1$ of head portions in the separated condition there lies a same relationship as in the above described second embodiment (FIG. 11), and the distance between head portions is maintained sufficiently small in comparison to the thickness of the head portion.

In the second and fourth embodiments of the invention, as shown in FIG. 11 the head portions are not joined and arrayed perpendicularly to the connecting bar 5.

It is, however, possible to arrange the head portions at any desired angle to the connecting bar 5, i.e. at an inclination to the line normal to the connecting bar 5. The fifth to seventh embodiments described hereinunder are realized on the basis of this concept.

Figure 18:
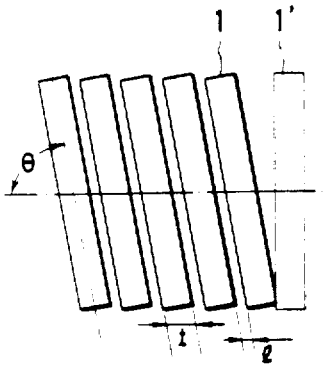
FIGS. 18, 19 and 20 are plan views of head portions of tag pin assemblies constructed in accordance with a fifth, sixth and seventh embodiments of the invention, respectively.

As will be seen from FIG. 18, the tag pin assembly of the fifth embodiment, head portions 1 are inclined at an angle $\theta$ to the neutral line, i.e. the connecting bar, of the assembly as viewed in plan. The adjacent cross bars are joined in a manner shown in FIG. 8. At the same time, the distance between adjacent head portions 1 is selected to be sufficiently small as compared with the thickness of the head portion 1 as in the case of the second embodiment shown in FIG. 11. By arranging the head portion 1 at such an inclination, when two assemblies are brought together, the direction of gaps between head portions in the first assembly differs from the direction of head portions in the other assembly, so that the entanglement between two assemblies due to the catching of head portions in the gaps of the other assembly is fairly avoided.

In addition, when the head portions are moved from the inclined position to the position shown by broken line, i.e. to the position 1′ perpendicular to the neutral line C, the head portions 1 are superposed in mutual contact so that the entanglement of assemblies as well as the disorder of array of head portions due to displacement of heads in each assembly, is eliminated. The disorder of array of head portions is prevented also when the connecting bar is bent.

Figure 19:
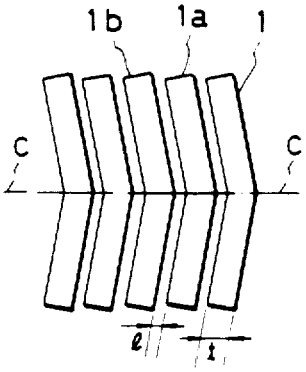

Referring now to FIG. 19 showing the sixth embodiment, the head portion 1 has a boomerang-shaped plan and adjacent cross bars are connected to each other. In addition, the relationship between the distance l between adjacent head portions and the thickness t of the head portion as specified in the second embodiment, i.e. the relationship of $t > l$ applies also to this embodiment. In this embodiment, since the head portion has a boomerang-shaped plan and since there is a relation expressed by $t > l$, the head portion 1a, when it is forced to move laterally with respect to the neutral line C, comes to contact the head portion 1 and head portion 1b, so that the disorder of array of tag pins in each assembly is eliminated effectively.

Figure 20:
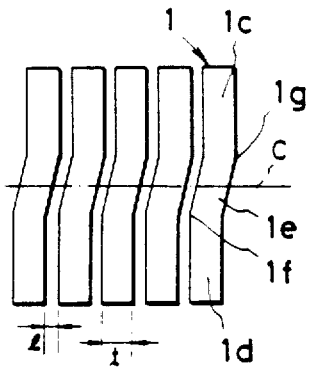

FIG. 20 shows the seventh embodiment of the invention in which the head portion has such a winding plan as to include both end portion 1c, 1d perpendicular to the neutral axis C and a central portion 1e inclined to the neutral axis C. The adjacent tag pins are joined at the cross bars. The relationship of $t > l$ between the pitch l and the thickness t of head portion applies also to this embodiment. In this embodiment, the displacement of the tag pin 1a laterally with respect to the neutral axis C is prevented because the bent point 1f or 1g contacts adjacent tag pins due to the ⌐-shaped winding planar form of the head portion and due to the relation $t > l$.

Figure 21:
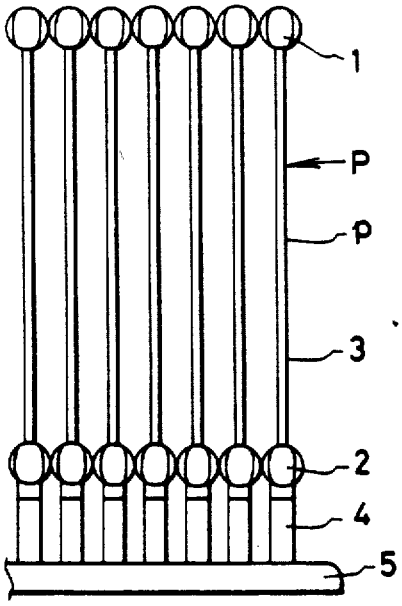
FIG. 21 is a front elevational view of a portion of a tag pin assembly constructed in accordance with an eighth embodiment of the invention.
Figure 22:
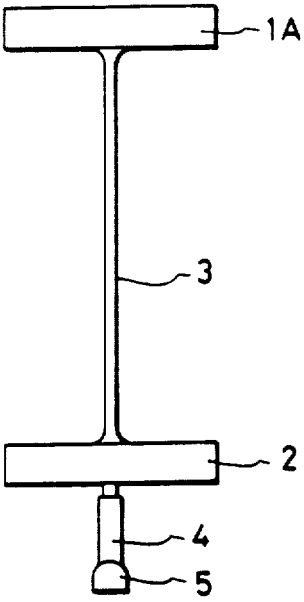
FIG. 22 is a side elevational view of the tag pin assembly shown in FIG. 21.

FIGS. 21 and 22 shows the eighth embodiment of the invention in which the head portion 1 and the cross bar 2 have an identical shape and are joined respectively to the head portion and cross bar of the adjacent tag pin. In this embodiment, the amount of resin used in the formation is saved and the construction of the mold is simplified because the head portion is formed to have the same shape as the cross bar.

Figure 23:
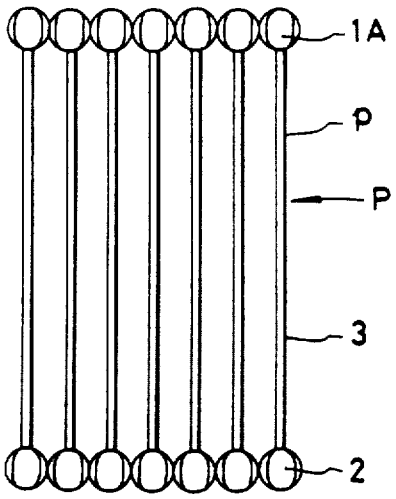
FIG. 23 is a front elevational view of a portion of a tag pin assembly constructed in accordance with a ninth embodiment of the invention.
Figure 24:
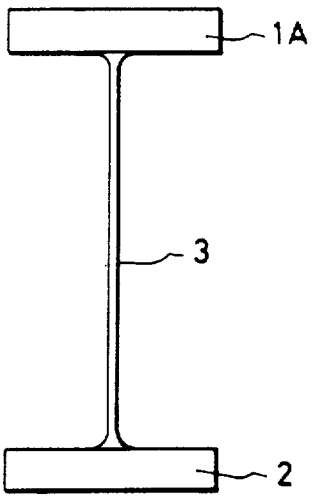
FIG. 24 is a side elevational view of the tag pin assembly shown in FIG. 23.

FIGS. 23 and 24 show a ninth embodiment of the invention in which the connecting necks 4 and the connecting bar 5 are omitted from the tag pin assembly of the eighth embodiment so that assembly as a whole has an H-shaped cross-section as shown in FIG. 24. In this embodiment, the construction of the tag pin assembly is extremely simplified and compact to further save the resin material. Also, the handling of the assembly is facilitated thanks to the simplified construction.

Hereinafter, a discussion will be made as to the shape of the head portion in tag pin assembly having separated head portions.

In the second and fourth embodiments, the arrangement of the tag pins are considered in front elevation and plan. The side elevation of each tag pin, however, is also an important factor for preventing the entanglement of the head portions. Thus, the tag pin can have various shapes as viewed in side elevation.

Figure 12:
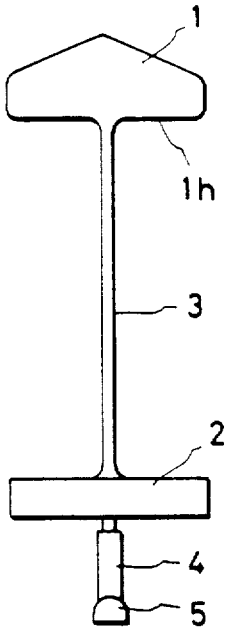
FIG. 12 is a side elevational view of the tag pin assembly shown.
Figure 13:
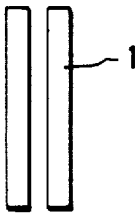
FIG. 13 is a view taken in the direction of the arrow A'—A' in FIG. 11.
Figure 25:
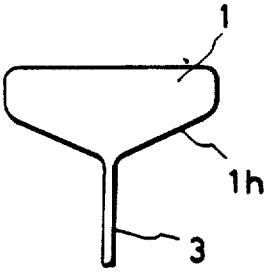
FIG. 25 is a side elevational view of head portion of a tag pin in a tag pin assembly constructed in accordance with a tenth embodiment of the invention.

In the tag pin of the tag pin assembly of, for example, the second embodiment shown in FIG. 12, the lower edge 1h of the head 1 extends in parallel with the cross bar 2. This shape of the tag pin, however, makes it difficult to release entangling head portions 1 from each other. This problem is overcome by forming the lower edge 1h of the head 1 in a V-like shape, because such a shape of lower edge permits a sliding movement to facilitate release of entangling head portions. FIG. 25 shows a tenth embodiment in which the lower edge 1h formed to have a V-like shape. In other words, the lower edge gets remoter from the cross bar as it gets farther from the filament portion 3.

FIGS. 26A to 26F show eleventh to sixteeth embodiments having different forms of the head portion. More specifically, in the eleventh embodiment shown in FIG. 26A, the head portion 1 has a sector shape, while, in the twelfth embodiment shown in FIG. 26B, the head portion has a semicircular form. In the thirteenth embodiment shown in FIG. 26C, the head portion has a form resembling that of a cathode ray tube.

Figure 26:
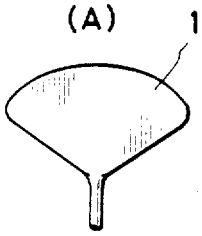
FIGS. 26A to 26F are side elevational views showing the head portions of tag pins in accordance with eleventh to sixteenth embodiments, respectively.
Figure 26:
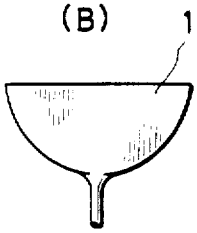
Figure 26:
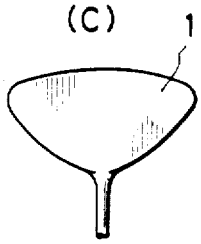
Figure 26:
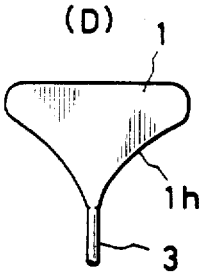
Figure 26:
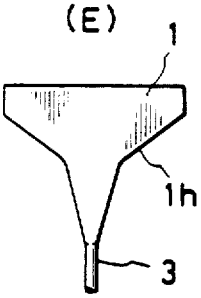
Figure 26:
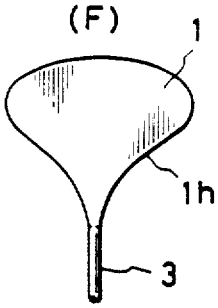

In fourteenth to sixteenth embodiments shown in FIGS. 26D or 26F, the lower edge 1h of the head portion 1 is gradually narrowed to approach the extension of the filament portion 3.

By adopting these side elevational shapes of the head portion with tapered lower edge, the head portions can be easily released even when they are entangled with each other.

As has been described, according to the invention, there is provided a cluster type tag pin assembly having a multiplicity of tag pins each having a head portion and a cross bar interconnected by a filament portion, wherein the adjacent tag pins are joined at least at their cross bars.

Therefore, according to the invention, it is possible to obtain a high degree of integration of tag pins such that cross bars of tag pins form a sheet or plate. In consequence, the filament portions of tag pins are arrayed in the form of a flat sheet so that head portions are arrayed in good order even if the head portions are formed in the separated state.

Figure 1:
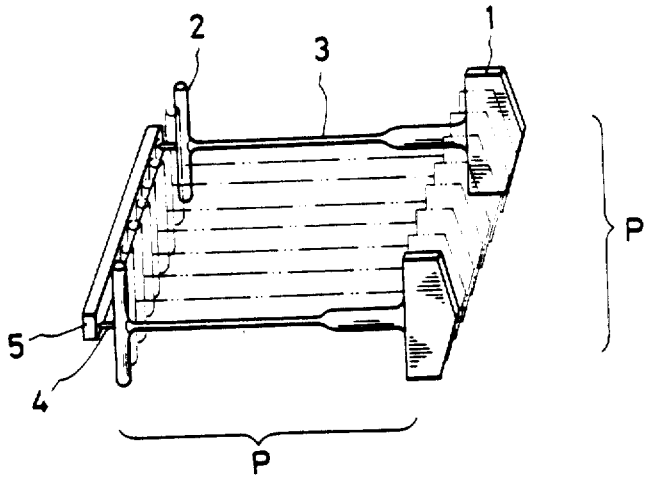
FIG. 1 is a schematic perspective view of a conventional tag pin assembly.
Figure 2:
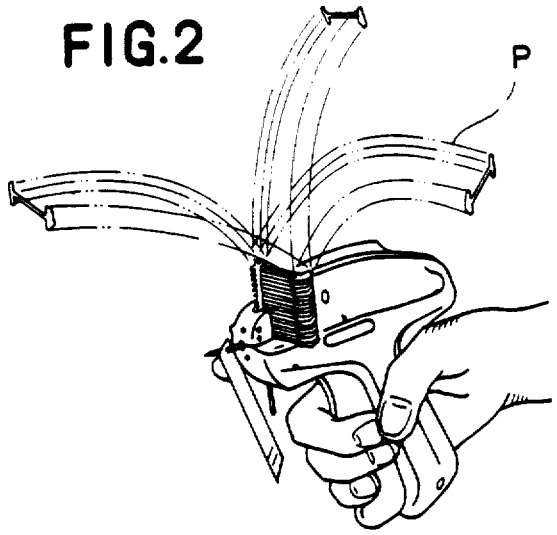
FIG. 2 is an illustration of a conventional elongated tag pin assembly in the state of use.

In the conventional tag pin assembly, the assembly is largely deflected and rocked when treated in an attachment device as shown in FIG. 2, so that the efficiency of operation of the attachment device is lowered impractically. In addition, there is a fear that a part of the tag pin is caught by woven goods to cause a cutting or fray of the yarn. These problems are completely avoided in the tag pin assembly of the invention.

The tag pin assembly of the invention is suitable for mass production and conveniently used in the attaching of a large number of tags in a short time, because each assembly can contain tag pins of a number which is twice or more as large as that carried by the conventional tag pin assembly having an equal length.

In addition, since tag pins are arrayed without substantial gap, the undesirable entanglement and other problems are avoided to permit an easier handling in packing and transportation.

In the concentional tag pin assembly, head portions are connected by short connecting strings which are torn, when the tag pins are severed, to leave a projection like "whisker" which seriously damages the goods. This problem is completely overcome by the present invention because the joint portion on the cross bar is constituted at least by expanded portion on the side face of the cross bar as shown in FIG. 11 so that no "whisker" is formed when the tag pin piece is severed from the assembly.

Furthermore, since tag pins are arranged at a high density to reduce the size of the tag pin assembly as a whole, the size of the mold for forming the assembly is reduced correspondingly to ensure a good flow of molten resin to reduce the rate of production of unacceptable products.

What is claimed is:

1. A cluster type tag-pin assembly comprising a plurality of tag pins, each said tag pin having a head portion, a cross bar and a filament portion which joins said head portion to said cross bar, each said cross bar including a connecting neck which extends therefrom in a direction opposite to said filament portion, said tag pins being connected through their respective connecting necks to a connecting bar at substantially right angles to said connecting neck to form an assembly of joined tag pins, said assembly of tag pins being integrally formed from a synthetic resin into a comb-like assembly as a whole, each said cross bar having opposing expanded portions defining apeces formed on opposite central parts of each side face thereof, adjacent expanded portions of said cross bars being connected to each other through said apeces of their respective expanded portions whereby all cross bars in the tag pin assembly are arranged in a sheet-like form, said expanded portions being separated when a shearing force is applied thereto, adjacent head portions of said tag pins being spaced with a gap smaller than the thickness of the head portion.

2. A cluster type tag-pin assembly comprising a plurality of tag pins, each said tag pin having a head portion, a cross bar and a filament portion which joins said head portion to said cross bar, each said cross bar including a connecting neck which extends therefrom in a direction opposite to said filament portion, said tag pins being connected through their respective connecting necks to a connecting bar at substantially right angles to said connecting neck to form an assembly of joined tag pins, said assembly of tag pins being integrally formed from a synthetic resin into a comb-like assembly as a whole, each said head portion having opposing side faces and having an expanded portion defining an apex formed on a central portion of each said side face thereof, each said cross bar having opposing sides and having an expanded portion defining an apex formed in a central part on each side thereof, each head portion being connected to adjacent head portions through said apeces of their respective expanded portions and each cross bar being connected to adjacent cross bars through said apeces of their respective expanded portions wherein all head portions and all cross bars in the tag pin assembly are arranged in a sheet-like form, said joined head portions and joined cross bars being separated when a shearing force is applied thereto.

3. A cluster type tag-pin assembly as claimed in claim 2, wherein said expanded portion of said head portion has an inclined face from a central part of the side face thereof toward the edge of the head portion.

4. A cluster type tag-pin assembly as claimed in claim 2, wherein head portions of the number of tag pins in the tag pin assembly comprise a first and a second group which are alternately disposed in the assembly, each head portion of said first group having said expanded portion formed on each side face thereof through which each adjacent head portion of this group are connected to each other, while each head portion of said second group being devoid of said expanded portion and being flat on each side face thereof, each adjacent head portion of said second group being spaced with a gap smaller than the thickness of a head portion.

5. A cluster type tag-pin assembly as claimed in claim 2, wherein said head portion has a same configuration as said cross bar.

6. A cluster type tag-pin assembly as claimed in either claim 1 or 2, wherein said expanded portion of said cross bar has an inclined face from a central part toward the edge of the cross bar.

7. A cluster type tag-pin assembly as claimed in either claim 1 or 2, wherein said head portion has flat side faces and, in a top plan view of the tag-pin assembly, is arranged with an inclination relative to said cross bar (FIG. 18).

8. A cluster type tag-pin assembly as claimed in either claim 1 or 2, wherein said head portions has flat side faces and, in a top plan view of the tag pin assembly, has a bent shape resembling a boomerang.

9. A cluster type tag-pin assembly as claimed in either claim 1 or 2, wherein said head portion has flat side faces and, in a top plan view of the tag pin assembly, has a bent portion at an interior portion thereof.

10. A cluster type tag-pin assembly as claimed in either claim 1 or 2, wherein the edge of said head portion on the side facing said cross bar is so formed as to gradually increasingly depart from the cross bar.

*11. A cluster type tag-pin assembly comprising a plurality of tag pins, each said tag pin consisting only of a head portion, a cross bar and a filament portion which joins said head portion to said cross bar, said assembly of tag pins being integrally formed from a synthetic resin into a comb-like assembly as a whole, each said head portion having opposing side faces and side edges, each said side face having an expanded portion defining an apex formed on a central portion thereof which tapers towards the side edges of said head portion, each said cross bar having opposing sides and having an expanded portion defining an apex formed in a central part on each side thereof, each side face of each said head portion extending in a plane parallel to the plane in which each said cross bar extends, each head portion being connected to adjacent head portions only through said apeces of their respective expanded portions and each cross bar being connected to adjacent cross bars only through said apeces of their respective expanded portions wherein all head portions and all cross bars in the tag pin assembly are arranged in a sheet-like form, the taper of said apex on said side faces of said head portions being sufficiently small such that adjacent side faces immediately contact one another adjacent said side edges thereof when forced together to prevent substantial sway of said assembly, said apeces on said sides of said cross bars being sufficiently small such that adjacent cross bars immediately contact one another at the ends thereof when forced together to further prevent substantial sway of said assembly, said joined head portions and joined cross bars being separated when a shearing force is applied thereto.*

* * * * *